(12) United States Patent
Yuasa et al.

(10) Patent No.: US 8,361,939 B2
(45) Date of Patent: Jan. 29, 2013

(54) MULTILAYERED SINTERED SLIDING MEMBER

(75) Inventors: Takayuki Yuasa, Tokyo (JP); Masaya Yorifuji, Tokyo (JP); Tomoyuki Yamane, Kanagawa (JP); Shinya Nishimura, Kanagawa (JP)

(73) Assignees: Caterpillar Japan Ltd., Tokyo (JP); Oiles Corporation, Tokyo (JP)

( * ) Notice: Subject to any disclaimer, the term of this patent is extended or adjusted under 35 U.S.C. 154(b) by 294 days.

(21) Appl. No.: 12/671,275

(22) PCT Filed: Jul. 30, 2008

(86) PCT No.: PCT/JP2008/002050
§ 371 (c)(1),
(2), (4) Date: Mar. 17, 2010

(87) PCT Pub. No.: WO2009/016840
PCT Pub. Date: Feb. 5, 2009

(65) Prior Publication Data
US 2010/0197534 A1    Aug. 5, 2010

(30) Foreign Application Priority Data

Jul. 31, 2007   (JP) ................................. 2007-198945

(51) Int. Cl.
*F16C 33/06* (2006.01)

(52) U.S. Cl. ....................... 508/105; 508/103

(58) Field of Classification Search .................. 508/103, 508/105
See application file for complete search history.

(56) References Cited

U.S. PATENT DOCUMENTS

| | | | |
|---|---|---|---|
| 3,881,837 A * | 5/1975 | Novosel et al. ............... | 408/144 |
| 5,126,212 A * | 6/1992 | Yamada et al. ............... | 428/547 |
| 2003/0209103 A1 | 11/2003 | Takayama | |

FOREIGN PATENT DOCUMENTS

| | | |
|---|---|---|
| JP | 57-101603 | 6/1982 |
| JP | 1-108304 | 4/1989 |
| JP | 05043995 A * | 2/1993 |
| JP | 8-109450 | 4/1996 |

OTHER PUBLICATIONS

International Search Report for PCT/JP2008/002050, mailed Sep. 22, 2008.
Supplementary European Search Report in EP 08 79 0314 dated Aug. 30, 2012.

* cited by examiner

*Primary Examiner* — Jim Goloboy
(74) *Attorney, Agent, or Firm* — Nixon & Vanderhye P.C.

(57) ABSTRACT

In a multilayered sintered sliding member, a porous sintered alloy layer comprising 3 to 10 wt. % of an Sn component, 10 to 30 wt. % of an Ni component, 0.5 to 4 wt. % of a P component, 30 to 50 wt. % of an Fe component, 1 to 10 wt. % of a high-speed tool steel component, 1 to 5 wt. % of a graphite component, and 20 to 55 wt. % of a copper component is integrally diffusion-bonded to a backing plate.

5 Claims, No Drawings

MULTILAYERED SINTERED SLIDING MEMBER

This application is the U.S. national phase of International Application No. PCT/JP2008/002050 filed 30 Jul. 2008, which designated the U.S. and claims priority to Japan Application No. 2007-198945 filed 31 Jul. 2007, the entire contents of which are hereby incorporated by reference.

TECHNICAL FIELD

The present invention relates to a multilayered sintered sliding member suitable for use under high-load and low-speed conditions, and more particularly to a multilayered sintered sliding member formed of a backing plate and a porous sintered alloy layer integrally bonded to the backing plate.

BACKGROUND ART

Patent document 1: JP-B-59-39481
Patent document 2: JP-B-7-91569

Conventionally, as multilayered sintered sliding members, there are known a so-called wound bush bearing in which a porous sintered alloy layer is integrally bonded to an obverse surface of a thin steel plate and a laminate thereof is convoluted with the sintered alloy layer placed on the inner side, as well as a cylindrical sliding member in which a porous sintered alloy layer is integrally bonded to an inner surface of a steel pipe by means of an adhesive. With the former wound bush bearing, however, a large compressive stress is applied to the sintered alloy layer at the time of bending into the cylindrical shape, so that there is a possibility of causing a decline or nonuniformity in the bonding strength between the thin steel plate and the sintered alloy layer. In addition, with the method based on bending, the thickness of the sintered alloy layer cannot be made large, so that a problem is involved in that the range of use as the sliding member is naturally limited. In addition, with the latter cylindrical sliding member, there is a problem in that firm bonding strength is difficult to obtain between the inner surface of the steel pipe and the porous sintered alloy layer.

In view of the above-described circumstances, the present applicant proposed a multilayered sintered sliding member wherein a porous sintered alloy layer having copper (Cu) as a principal component and additionally consisting of fixed amounts of tin (Sn), nickel (Ni), phosphorus (P), and graphite (C) is integrally bonded to an inner surface of a backing plate constituted by a steel pipe and a multilayered sintered sliding member wherein the porous sintered alloy layer further having a fixed amount of iron (Fe) added thereto is integrally bonded thereto (Patent Document 1), as well as a multilayered sintered sliding member wherein a porous sintered alloy layer similar to the above-described one is integrally bonded to an obverse surface of a backing plate constituted by a steel plate (Patent Document 2).

DISCLOSURE OF THE INVENTION

Problems to be Solved by the Invention

In the multilayered sintered sliding members described in Patent Document 1 and Patent Document 2 described above, particularly the Ni component among the components is diffused into the surface of the steel backing plate to thereby alloy its interface and increase the bonding strength of the porous sintered alloy layer with the steel backing plate, and is partially alloyed with P among the components to thereby form an Ni—P alloy. The Ni—P allay, which excels in wettability with the copper alloy, is present at the interface between the sintered alloy layer and the steel backing plate, and firmly bonds the sintered alloy layer to the steel backing plate, coupled with the alloying due to the Ni diffusion into the interface. Further, since the porous sintered alloy layer and the steel backing plate are firmly bonded, the loading characteristic is substantially improved, and coupled with the friction and wear characteristics of the sintered alloy layer, the applicable range of the sintered sliding member is expanded, thereby enabling the application to use under high load (high bearing surface pressure), which has not been possible with the conventional sintered sliding members.

However, the allowable bearing surface pressure of the above-described multilayered sintered sliding members is in the vicinity of 49 MPa (500 kgf/cm$^2$), and in uses where higher bearing surface pressure acts, such as toggle bushings of injection molding machines and bearings of joint portions in such construction machines as hydraulic excavators, there has been demand for further improvement from the viewpoints of fatigue resistance and wear resistance of the porous sintered alloy layer.

As a result of repeatedly conducting strenuous studies to achieve further improvement of the load carrying capacity and friction and wear characteristics of the above-described multilayered sintered sliding members, the present inventors obtained a finding that, by allowing a prescribed amount of a high-speed tool steel to be further contained in the above-described porous sintered alloy layer, it is possible to improve the fatigue durability of the porous sintered alloy layer and improve the load carrying capacity and friction and wear characteristics, enabling application to the aforementioned uses of high load (high bearing surface pressure).

The present invention has been completed based on the above-described finding, and its object is to provide a multilayered sintered sliding member which excels in the fatigue durability, load carrying capacity, and friction and wear characteristics even in uses a high bearing surface pressure exceeding the aforementioned allowable bearing surface pressure acts.

Means for Overcoming the Problems

A multilayered sintered sliding member in accordance with the present invention is characterized in that a porous sintered alloy layer comprising 3 to 10% by weight of a tin component, 10 to 30% by weight of a nickel component, 0.5 to 4% by weight of a phosphorus component, 30 to 50% by weight of an iron component, 1 to 10% by weight of a high-speed tool steel component, 1 to 5% by weight of a graphite component, and 20 to 55% by weight of a copper component is integrally diffusion-bonded to a backing plate.

According to the multilayered sintered sliding member in accordance with the present invention, during sintering, the Ni component is diffused into the surface of the backing plate to thereby alloy its interface, and forms a partial liquid phase with the P component among the components to thereby produce an Ni—P alloy (Ni$_3$P) excelling in wettability with a Cu—Ni—Sn alloy. This Ni$_3$P is interposed at the interface between the backing plate and the porous sintered alloy layer, and firmly bonds and integrates the porous sintered alloy layer to the backing plate, coupled with the alloying due to the diffusion of the Ni component at the interface. In addition, Ni$_3$P, which is a hard intermetallic compound produced during sintering, is interposed at grain boundaries of a Cu—Ni—Sn alloy phase. Furthermore, the hard high-speed tool steel component which in itself is composed of fine intermetallic compounds, principally carbides, is dispersedly contained at the grain boundaries between the Cu—Ni—Sn alloy phase and an αFe phase. Therefore, the fatigue durability, load carrying capacity, and friction and wear characteristics of the porous sintered alloy layer are substantially improved.

In the multilayered sintered sliding member in accordance with the present invention, in the porous sintered alloy layer which is integrally diffusion-bonded to the backing plate, lubricating oil may be contained at a rate of 5 to 20% by volume. As the lubricating oil, a mineral oil such as engine oil or gear oil or a synthetic oil such as ester oil is selected, as required, according to use.

This lubricating oil is able to improve the friction and wear characteristics, coupled with the lubricity of the graphite component itself dispersedly contained in the porous sintered alloy layer.

In the multilayered sintered sliding member in accordance with the present invention, as the high-speed tool steel component, a tungsten (W)-based high-speed tool steel or a molybdenum (Mo)-based high-speed tool steel is preferably used, and particularly the molybdenum-based high-speed tool steel is suitably used.

In the multilayered sintered sliding member in accordance with the present invention, the backing plate may be formed of a steel pipe or a tabular steel plate. The porous sintered alloy layer may be integrally diffusion-bonded to the cylindrical inner surface of the steel pipe or a flat surface of the tabular steel plate such as a plate, a block, or the like.

The multilayered sintered sliding member in which the porous sintered alloy layer is integrally diffusion-bonded to the cylindrical inner surface is used as a cylindrical bearing. The multilayered sintered sliding member in which the porous sintered alloy layer is integrally diffusion-bonded to the flat surface is used, in its original form, as a sliding plate or a slide plate, or as a so-called wound bush in a form in which the multilayered sintered sliding member is convoluted into a hollow cylindrical form with the porous sintered alloy layer placed on the inner side. Further, the multilayered sintered sliding member in which the porous sintered alloy layer is integrally diffusion-bonded to a flat surface of a block is used as a part constituting a jig.

Advantages of the Invention

According to the present invention, it is possible to provide a multilayered sintered sliding member in which a porous copper-based sintered body comprising 3 to 10 wt. % of an Sn component, 10 to 30 wt. % of an Ni component, 0.5 to 4 wt. % of a P component, 30 to 50 wt. % of an Fe component, 1 to 10 wt. % of a high-speed tool steel component, 1 to 5 wt. % of a graphite component, and 20 to 55 wt. % of a Cu component is integrally diffusion-bonded to a backing plate. In this multilayered sintered sliding member, $Ni_3P$, which is a hard intermetallic compound produced during sintering, is interposed at grain boundaries of the Cu—Ni—Sn alloy phase. Furthermore, the hard high-speed tool steel component which in itself is composed of fine intermetallic compounds, principally carbides, is dispersedly contained at the grain boundaries between the Cu—Ni—Sn alloy phase and the αFe phase. Therefore, the fatigue durability, load carrying capacity, and friction and wear characteristics of the porous sintered alloy layer are substantially improved, enabling application to uses where high bearing surface pressure acts.

BEST MODE FOR CARRYING OUT THE INVENTION

Hereafter, a detailed description will be given of the multilayered sintered sliding member in accordance with the present invention.

In the multilayered sintered sliding member in accordance with a preferred embodiment of the present invention, a porous sintered alloy layer comprising 3 to 10 wt. % of an Sn component, 10 to 30 wt. % of an Ni component, 0.5 to 4 wt. % of a P component, 30 to 50 wt. % of an Fe component, 1 to 10 wt. % of a high-speed tool steel component, 1 to 5 wt. % of a graphite component, and 20 to 55 wt. % of a Cu component is integrally diffusion-bonded to a backing plate.

In such a multilayered sintered sliding member, the Cu component for forming the porous sintered alloy layer contributes to the improvement of the strength, toughness, mechanical strength, and wear resistance of the matrix of the porous sintered alloy layer. The Sn component produces a liquid phase from the temperature of 232° C. in the sintering process and is alloyed with the Cu component and the below-described Ni component to form a Cu—Ni—Sn alloy, thereby contributing to the improvement of the strength, toughness, mechanical strength, and wear resistance of the matrix of the porous sintered alloy layer. If the compounding amount of the Sn component is less than 3 wt. %, the aforementioned effects are not exhibited sufficiently, and if the Sn component is compounded in excess of 10 wt. %, adverse effects are exerted on sinterability. Accordingly, 3 to 10 wt. %, particularly 5 to 8 wt. %, is appropriate as the compounding amount of the Sn component.

The Ni component forms a partial liquid phase with the below-described P component during sintering and produces an Ni—P alloy ($Ni_3P$) excelling in wettability with the aforementioned Cu—Ni—Sn alloy. This Ni—P alloy is interposed at an interface between the porous sintered alloy layer of the Cu—Ni—Sn alloy phase and the backing plate, and acts to firmly bond and integrate the porous sintered alloy layer to the backing plate, coupled with the alloying due to the diffusion of the Ni component at the interface. In addition, the intermetallic compound of $Ni_3P$ produced during sintering is hard and is interposed at grain boundaries of the Cu—Ni—Sn alloy phase, thereby imparting improvement of wear resistance to the porous sintered alloy layer. If the compounding amount of the Ni component is less than 10 wt. %, the aforementioned effects cannot be obtained, and if the Ni component is compounded in excess of 30 wt. %, a noticeable difference does not appear in the aforementioned effects, so that an upper limit of its compounding amount is 30 wt. %. Accordingly, 10 to 30 wt. %, particularly 10 to 20 wt. %, is appropriate as the compounding amount of the Ni component.

The P component is partially alloyed with the Cu component and the Ni component among the components to enhance the strength of the matrix of the porous sintered alloy layer and contribute to the improvement of the wear resistance. Since the P component has strong reducing power, the P component has the effects of cleansing the surface of the backing plate by virtue of its reducing action and promoting the alloying due to the aforementioned dispersion of the Ni component into the surface of the backing plate. It should be noted that the effects of the Ni—P alloy are as described above. If the compounding amount of the P component is less than 0.5 wt. %, the aforementioned effects are not exhibited sufficiently, and if the P component is compounded in excess of 4 wt. %, the amount of the Ni—P alloy produced becomes large, so that there is a possibility of causing a decline in the wear resistance to the contrary. Accordingly, 0.5 to 4 wt. %, particularly 0.5 to 2 wt. %, is appropriate as the P component. The P component should preferably be compounded in the form of a P—Cu alloy, e.g., a Cu-15% P alloy.

The Fe component is not solidly dissolved with the Cu component but is dispersed in the alloy structure, exhibits the effect of enhancing the strength of the matrix in particular, and exhibits the effect of increasing the porosity of the sintered body when part of the Cu component is diffused into the Fe component during sintering. In general, the Fe component shows the tendency of alloying with the P component and precipitating a hard Fe—P alloy under the presence of the P component. In the present invention, however, since Ni—P is alloyed at a lower temperature than the alloying temperature of Fe—P, the action of inhibiting the alloying of Fe—P is exhibited due to the alloying of Ni—P, so that it becomes possible to contain a relatively large amount of the Fe component up to 50 wt. %. If the compounding amount of the Fe component is less than 30 wt. %, the aforementioned effects are not exhibited sufficiently, and if the Fe component is compounded in excess of 50 wt. %, there is a possibility of precipitating the Fe—P alloy. Accordingly, 30 to 50 wt. %, particularly 35 to 45 wt. %, is appropriate as the Fe component.

As for the high-speed tool steel (SKH) component, fine intermetallic compounds and carbides are present in itself, are dispersed in the sintered structure, and play the role of a hard phase. Additionally, alloy elements from the high-speed tool steel component are dispersed during sintering to strengthen the matrix (so-called dispersion strengthening), thereby improving the wear resistance of the copper-based sintered body. If the compounding amount of the high-speed tool steel component is less than 1 wt. %, the aforementioned effects are not exhibited, and if the high-speed tool steel component is compounded in excess of 10 wt. %, the amount of the hard phase dispersed becomes large, causing a decline in the wear resistance to the contrary. Accordingly, 1 to 10 wt. %, particularly 2 to 3 wt. %, is appropriate as the compounding amount of the high-speed tool steel component. As the high-speed tool steel component, a powder of the high-speed tool steel material which is defined in G 4403 of the Japanese Industrial Standards (JIS), particularly a high-speed tool steel material among the following Mo-based SKH40 and SKH50 to SKH59, is recommended: SKH40—C: 1.23 to 1.33%, Si: 0.45% or less, Mn: 0.40% or less, P: 0.030% or less, S: 0.030% or less, Cr: 3.80 to 4.50%, Mo: 4.70 to 5.30%, W: 5.70 to 6.70%, V: 2.70 to 3.20%, Co: 8.00 to 8.88%, and Fe: the balance; SKH50—C: 0.77 to 0.87%, Si: 0.70% or less, Mn: 0.45% or less, P: 0.030% or less, S: 0.030% or less, Cr: 3.50 to 4.50%, Mo: 8.00 to 9.00%, W: 1.40 to 2.00%, V: 1.00 to 1.40%, and Fe: the balance; SKH51—C: 0.80 to 0.88%, Si: 0.45% or less, Mn: 0.40% or less, P: 0.030% or less, S: 0.030% or less, Cr: 3.80 to 4.50%, Mo: 4.70 to 5.20%, W: 5.90 to 6.70%, V: 1.70 to 2.10%, and Fe: the balance; SKH52—C: 1.00 to 1.10%, Si: 0.45% or less, Mn: 0.40% or less, P: 0.030% or less, S: 0.030% or less, Cr: 3.80 to 4.50%, Mo: 5.50 to 6.50%, W: 5.90 to 6.70%, V: 2.30 to 2.60%, and Fe: the balance; SKH53—C: 1.15 to 1.25%, Si: 0.45% or less, Mn: 0.40% or less, P: 0.030% or less, S: 0.030% or less, Cr: 3.80 to 4.50%, Mo: 4.70 to 5.20%, W: 5.90 to 6.70%, V: 2.70 to 3.20%, and Fe: the balance; SKH54—C: 1.25 to 1.40%, Si: 0.45% or less, Mn: 0.40% or less, P: 0.030% or less, S: 0.030% or less, Cr: 3.80 to 4.50%, Mo: 4.20 to 5.00%, W: 5.20 to 6.00%, V: 3.70 to 4.20%, and Fe: the balance; SKH55—C: 0.87 to 0.95%, Si: 0.45% or less, Mn: 0.40% or less, P: 0.030% or less, S: 0.030% or less, Cr: 3.80 to 4.50%, Mo: 4.70 to 5.20%, W: 5.90 to 6.70%, V: 1.70 to 2.10%, Co: 4.50 to 5.00%, and Fe: the balance; SKH56—C: 0.85 to 0.95%, Si: 0.45% or less, Mn: 0.40% or less, P: 0.030% or less, S: 0.030% or less, Cr: 3.80 to 4.50%, Mo: 4.70 to 5.20%, W: 5.90 to 6.70%, V: 1.70 to 2.10%, Co: 7.00 to 9.00%, and Fe: the balance; SKH57—C: 1.20 to 1.35%, Si: 0.45% or less, Mn: 0.40% or less, P: 0.030% or less, S: 0.030% or less, Cr: 3.80 to 4.50%, Mo: 3.20 to 3.90%, W: 9.00 to 10.00%, V: 3.00 to 3.50%, Co: 9.50 to 10.50%, and Fe: the balance; SKH58—C: 0.95 to 1.05%, Si; 0.70% or less, Mn: 0.40% or less, P: 0.030% or less, S: 0.030% or less, Cr: 3.50 to 4.50%, Mo: 8.20 to 9.20%, W: 1.50 to 2.10%, V: 1.70 to 2.20%, and Fe: the balance; and SKH59—C: 1.05 to 1.15%, Si: 0.70% or less, Mn: 0.40% or less, P: 0.030% or less, S: 0.030% or less, Cr: 3.50 to 4.50%, Mo: 9.00 to 10.00%, W: 1.20 to 1.90%, V: 0.90 to 1.30%, Co: 7.50 to 8.50%, and Fe: the balance.

The graphite component is dispersedly contained in the sintered alloy structure and acts as a solid lubricant. If the compounding amount of the graphite component is less than 1 wt. %, the action of the solid lubricant cannot be expected, and if the graphite component is compounded in excess of 5 wt. %, the strength of the sintered alloy layer is caused to decline. Accordingly, 1 to 5 wt. %, particularly 2 to 3 wt. %, is appropriate as the compounding amount of the graphite component.

Next, a description will be given of the method of manufacturing a multilayered sintered sliding member in which a sintered alloy layer having the above-described composition is integrally bonded to a backing plate to form a multiple layer.

As the backing plate for forming this multilayered sintered sliding member, a steel pipe formed of a carbon steel tube for general structural purpose (JIS G 3444) or a carbon steel tube for machine structural purpose (JIS G 3445) or a steel plate formed of a rolled steel for general structural purpose (JIS G 3101) or a carbon steel for machine structural purpose (JIS G 4051), is used.

Hereafter, a description will be given of the method of manufacturing a multilayered sintered sliding member using each backing plate.

<Method of Manufacturing a Multilayered Sintered Sliding Member Using a Steel Pipe as the Backing Plate>

A mixed powder is prepared by mixing in a V-type mixer 3 to 10 wt. % of an Sn powder, 10 to 30 wt. % of an Ni powder, 0.5 to 4 wt. % of a P component of a P—Cu alloy (Cu-15% P) powder, 30 to 50 wt. % of an Fe powder, 1 to 10 wt. % of a high-speed tool steel powder, and 1 to 5 wt. % of a graphite powder with respect to 20 to 55 wt. % of a Cu powder.

This mixed powder is pressurized in a required mold under a pressure in the range of 2 to 7 tons/cm$^2$ (196 to 686 MPa) to fabricate a hollow cylindrical molded green compact consisting of the mixed powder. This molded green compact is press-fitted to the inner surface of the steel pipe, and an assembly thereof is then placed in a heating furnace adjusted to a neutral or reducing atmosphere, and is sintered at a temperature of 900 to 1000° C. for 60 to 90 minutes to effect the diffusion bonding of the molded green compact to the inner surface of the steel pipe simultaneously with the sintering of the molded green compact. Thus, a multilayered sintered sliding member is fabricated in which the sintered alloy layer is integrally diffusion-bonded to the inner surface of the steel pipe.

In this manufacturing method, in a case where the amount of expansion (to the outside-diameter side) of the molded green compact during sintering is smaller than the amount of expansion of the steel pipe, a ceramic powder is filled onto the inner surface of the molded green compact to restrict the amount of expansion of the molded green compact to the inside-diameter side and cause the expansion to be directed toward the outside-diameter side, and further to restrict the amount of shrinkage of the molded green compact to the inside-diameter side during cooling after sintering and cause the shrinkage to be directed toward the outside-diameter side. Firm bonding can thereby be obtained between the steel pipe and the molded green compact.

The multilayered sintered sliding member thus fabricated is subjected to machining to fabricate a desired hollow cylindrical bearing, and is subsequently subjected to oil impregnation treatment, whereby lubricating oil is contained in the porous sintered alloy layer at a rate of 5 to 20 vol. %.

<Method of Manufacturing a Multilayered Sintered Sliding Member Using a Steel Plate as the Backing Plate>

In the case where a steel plate is used as the backing plate, it is preferable to use a powder rolling process as its manufacturing method, so that a description will be given of the manufacturing method using this powder rolling process. A mixed powder similar to the mixed powder in the above-described method of manufacturing a multilayered sintered sliding member is prepared, and a powder binder is added to, and uniformly mixed with, that mixed powder to prepare a raw powder having wettability. As the powder binder, hydroxypropylcellulose (HPC) is suitably used.

The raw powder is fed to a horizontal rolling machine with a twin roll to fabricate a rolled sheet formed of the molded green compact.

After the rolled sheet is superposed on the aforementioned backing plate, an assembly thereof is then placed in a sintering furnace adjusted to a neutral or reducing atmosphere, and is sintered at a temperature of 900 to 1000° C. and under a pressure of 0.1 to 5.0 kgf/cm² (0.0098 to 0.49 MPa) for 60 to 90 minutes to effect the diffusion bonding of the sintered alloy layer to the backing plate simultaneously with the sintering of the rolled sheet. Thus, a multilayered sintered sliding member is fabricated in which the sintered alloy layer and the backing plate are integrated by the diffusion bonding.

The multilayered sintered sliding member thus fabricated is subjected to machining to fabricate a desired sliding plate or a slide plate, and is subsequently subjected to oil impregnation treatment, whereby lubricating oil is contained in the porous sintered alloy layer at a rate of 5 to 20 vol. %.

In the above-described manufacturing method, the so-called liquid phase sintering takes place in which a liquid phase of the Sn component among the components is produced at a temperature of 232° C. in the sintering process, and a liquid phase principally based on the Ni—P alloy ($Ni_3P$) is further produced starting from a temperature in the vicinity of 875° C. while the sintering progresses. The hard $Ni_3P$ is interposed at the grain boundaries of the Cu—Ni—Sn alloy in the porous sintered alloy layer of the multilayered sintered sliding member fabricated by such a manufacturing method, and the hard high-speed tool steel component, which in itself contains fine intermetallic compounds and carbides, is dispersedly contained at the grain boundaries between the Cu—Ni—Sn alloy phase and an αFe phase. Therefore, the fatigue durability, load carrying capacity, and friction and wear characteristics of the porous sintered alloy layer are substantially improved, with the result that application to uses where high bearing surface pressure acts becomes possible.

Examples

Hereafter, a detailed description will be given of the present invention through Examples, but the present invention is not limited to the following Examples unless it exceeds the gist thereof.

Examples 1 to 5 and Comparative Examples 1 and 2 are examples in which multilayered sintered sliding members are applied to sliding members (cylindrical bearings) of hollow cylindrical form.

Examples 1 to 5

Steel pipes each formed of a carbon steel tube for general structural purpose (STK 400) and having dimensions with an inside diameter of 33.6 mm, an outside diameter of 45 mm, and a length of 20 mm were prepared.

The following were charged into a V type mixer: 5 wt. % of an atomized Sn powder which passed a 250-mesh sieve; 15 wt. % of a reduced Ni powder which passed the 250-mesh sieve; 7 wt. % of a pulverized P—Cu alloy (P 15%) powder which passed a 120-mesh sieve; 30 to 45 wt. % of a reduced Fe powder which passed a 240-mesh sieve; 2 to 3 wt. % of a water-atomized high-speed tool steel powder which passed a 200-mesh sieve; 2 wt. % of a natural graphite powder which passed a 48-mesh sieve but did not pass the 250-mesh sieve; and the balance of an electrolytic Cu powder which passed a 150-mesh sieve. The charged powders were mixed for 30 minutes to thereby obtain a mixed powder (Sn: 5 wt. %, Ni: 15 wt. %, P: 1.05 wt. %, Fe: 30 to 45 wt. %, high-speed tool steel: 2 to 3 wt. %, natural graphite: 2 wt. %, and Cu: the balance).

The mixed powder was loaded in the hollow portion of a mold having a cylindrical hollow portion and was subjected to molding under a molding pressure of 5 tons/cm² (490 MPa), thereby fabricating a hollow cylindrical molded green compact having an inside diameter of 27.4 mm, an outside diameter of 33.6 mm, a length of 20 mm, and a density of 6.6 to 6.8 g/cm³.

After the molded green compact was press-fitted to the inner surface of the steel pipe from its axial direction, a ceramic powder (a mixture of 83 wt. % of $Al_2O_3$ and 17 wt. % of $SiO_2$) was filled onto the inner surface of that molded green compact. In a sintering furnace adjusted to a cracked ammonia gas atmosphere, this assembly was sintered at a temperature of 960° C. for 85 minutes to effect the diffusion bonding to the inner surface of the steel pipe simultaneously with the sintering of the molded green compact, thereby bonding and integrating the sintered alloy body and the steel pipe.

Next, this sintered assembly was subjected to machining, thereby obtaining a multilayered sintered sliding member having an inside diameter of 30 mm, an outside diameter of 45 mm, and a length of 20 mm. The density of the porous sintered alloy layer of this multilayered sintered sliding member was 6.8 to 7.0 g/cm³. When this multilayered sintered sliding member was subjected to oil impregnation treatment, the oil content of the porous sintered alloy layer was 13 to 15 vol. %.

Comparative Example 1

A steel pipe similar to that of the above-described Example was prepared, i.e., one which was formed of a carbon steel tube for general structural purpose and had dimensions with an inside diameter of 33.6 mm, an outside diameter of 45 mm, and a length of 20 mm.

The following were charged into the V type mixer: 8 wt. % of the atomized Sn powder which passed the 250-mesh sieve; 28 wt. % of the reduced Ni powder which passed the 250-mesh sieve; 7 wt. % of the pulverized P—Cu alloy (P 15%) powder which passed the 120-mesh sieve; 5 wt. % of the natural graphite powder which passed the 150-mesh sieve; and the balance of the electrolytic Cu powder which passed the 150-mesh sieve. The charged powders were mixed for 30 minutes to thereby obtain a mixed powder (Sn: 8 wt. %, Ni: 28 wt. %, P: 1.05 wt. %, natural graphite: 5 wt. %, and Cu: the balance).

The mixed powder was loaded in the hollow portion of the mold having the cylindrical hollow portion and was subjected to molding under a molding pressure of 5 tons/cm² (490 MPa), thereby fabricating a hollow cylindrical molded green compact having an inside diameter of 27.4 mm, an outside diameter of 33.6 mm, a length of 20 mm, and a density of 5.8 g/cm³.

After the molded green compact was press-fitted to the inner surface of the steel pipe from its axial direction, a ceramic powder (the same as that of the Example) was filled onto the inner surface of that molded green compact. In the sintering furnace adjusted to a cracked ammonia gas atmosphere, this assembly was sintered at a temperature of 960° C. for 60 minutes to effect the diffusion bonding to the inner surface of the steel pipe simultaneously with the sintering of the molded green compact, thereby bonding and integrating the sintered alloy body and the steel pipe.

Next, this sintered assembly was subjected to machining, thereby obtaining a multilayered sintered sliding member having an inside diameter of 30 mm, an outside diameter of 45 mm, and a length of 20 mm. The density of the porous sintered alloy layer of this multilayered sintered sliding member was 6.0 g/cm³. When this multilayered sintered sliding member was subjected to oil impregnation treatment, the oil content of the porous sintered alloy layer was 15 vol. %.

Comparative Example 2

A steel pipe similar to that of the above-described Example was prepared, i.e., one which was formed of a carbon steel tube for general structural purpose and had dimensions with an inside diameter of 33.6 nun, an outside diameter of 45 mm, and a length of 20 mm.

The following were charged into the V type mixer: 8 wt. % of the atomized Sn powder which passed the 250-mesh sieve; 28 wt. % of the reduced Ni powder which passed the 150-mesh sieve; 7 wt. % of the pulverized P—Cu alloy (P 15%) powder which passed the 120-mesh sieve; 5 wt. % of the natural graphite powder which passed the 150-mesh sieve; and the balance of the electrolytic Cu powder which passed the 150-mesh sieve. The charged powders were mixed for 10 minutes to thereby obtain a mixed powder (Sn: 8 wt. %, Ni: 28 wt. %, P: 1.05 wt. %, natural graphite: 5 wt. %, and Cu: the balance).

With respect to 60 wt. % of this mixed powder, 40 wt. % of a reduced Fe powder which passed a 100-mesh sieve was mixed in the V type mixer for 10 minutes to thereby obtain a mixed powder (Sn: 4.8 wt. %, Ni: 16.8 wt. %, P: 0.63 wt. %, Fe: 40 wt. %, natural graphite: 3 wt. %, and Cu: the balance).

The mixed powder was loaded in the hollow portion of the mold having the cylindrical hollow portion and was subjected to molding under a molding pressure of 5 tons/cm² (490 MPa), thereby fabricating a hollow cylindrical molded green compact having an inside diameter of 27.4 mm, an outside diameter of 33.6 mm, a length of 20 mm, and a density of 6.0 g/cm³.

Thereafter, in a method similar to that of Comparative Example 1, a multilayered sintered sliding member having an inside diameter of 30 mm, an outside diameter of 45 mm, and a length of 20 mm was obtained. The density of the porous sintered alloy layer of this multilayered sintered sliding member was 6.4 g/cm³. When this multilayered sintered sliding member was subjected to oil impregnation treatment, the oil content of the porous sintered alloy layer was 14 vol. %.

Next, with respect to the multilayered sintered sliding members obtained in Examples 1 to 5 and Comparative Examples 1 and 2 described above, the friction and wear characteristics were tested under the test conditions shown in Table 1, and the fatigue durability was tested under the test conditions shown in Table 2.

TABLE 1

(Friction and Wear Test Conditions)

| | |
|---|---|
| Load bearing surface pressure: | 100 MPa (1020 kgf/cm²) |
| Sliding speed: | 7.83 × 10⁻³ m/sec (0.47 m/min) |
| Oscillation angle: | 90° |
| Endurance time: | 100 hrs. |
| Mating shaft material: | induction-hardened chromium-molybdenum steel (SMC 440) |
| Form of motion: | continuous oscillating motion of a radial journal as a mating shaft |
| Lubrication condition: | application of grease before the test start |

TABLE 2

(Fatigue Resistance Test Conditions)

| | |
|---|---|
| Size of the cylindrical bearing (multilayered sintered sliding layer): | inside diameter of 30 mm, outside diameter of 45 mm, and length of 20 mm (pressure receiving area: 6 cm²) |
| Maximum load: | 88 MPa (898 kgf/cm²) |
| Minimum load: | 0.2 MPa (2 kgf/cm²) |
| Load cycle: | 20 Hz |
| Test method: | The maximum load and the minimum load were alternately applied to the cylindrical bearing (pressure receiving area: 6 cm²) 20 times per second, and an evaluation was made by the number of cycles (10 million cycles at maximum) until cracks occurred in the sintered alloy layer, i.e., the sliding surface. |

Component compositions and test results of the friction and wear characteristics and fatigue resistance of the multilayered sintered sliding members of Examples and Comparative Examples are shown in Tables 3 and 4.

TABLE 3

| | Examples | | |
|---|---|---|---|
| | 1 | 2 | 3 |
| Cu | Balance | balance | balance |
| Sn | 5 | 5 | 5 |
| Ni | 15 | 15 | 15 |
| P | 1.05 | 1.05 | 1.05 |
| Fe | 30 | 30 | 35 |
| High-speed tool steel | 2 | 3 | 2 |
| Graphite | 2 | 2 | 2 |
| Density of molded green compact (g/cm³) | 6.6 | 6.6 | 6.8 |
| Density of sintered alloy layer (g/cm³) | 6.8 | 6.9 | 7.0 |
| Oil content (vol. %) | 14 | 14 | 13 |
| Coefficient of friction | 0.13-0.15 | 0.12-0.15 | 0.12-0.16 |
| Amount of wear (μm) | 25.0 | 25.0 | 28.0 |
| Fatigue resistance (cycles) | 10 million | 10 million | 10 million |

TABLE 4

|  | Examples | | Comparative Examples | |
|---|---|---|---|---|
|  | 4 | 5 | 1 | 2 |
| Cu | balance | balance | balance | balance |
| Sn | 5 | 5 | 8 | 4.8 |
| Ni | 15 | 15 | 28 | 16.8 |
| P | 1.05 | 1.05 | 1.05 | 0.63 |
| Fe | 40 | 45 | — | 40 |
| High-speed tool steel | 3 | 3 | — | — |
| Graphite | 2 | 2 | 5 | 3 |
| Density of molded green compact (g/cm$^3$) | 6.8 | 6.7 | 5.8 | 6.0 |
| Density of sintered alloy layer (g/cm$^3$) | 6.8 | 6.8 | 6.0 | 6.4 |
| Oil content (vol. %) | 15 | 14 | 15 | 14 |
| Coefficient of friction | 0.11-0.14 | 0.12-0.15 | 0.12-0.35 | 0.13-0.35 |
| Amount of wear (μm) | 22.0 | 24.0 | 200 | 180 |
| Fatigue resistance (cycles) | 10 million | 10 million | 0.1 million | 0.1 million |

In Table 4, as for the multilayered sintered sliding members of Comparative Examples 1 and 2, since the coefficient of friction increased sharply at a point of time when the test time exceeded 40 hours in the friction and wear test, the test was discontinued at that point of time. As for the amount of wear, the amount of wear after the lapse of 40 hours of the test time is shown.

From the above test results, the multilayered sintered sliding members of Examples 1 to 5 showed stable sliding motion with low coefficients of friction even under a high load condition (100 MPa), and exhibited excellent friction and wear characteristics with small amounts of wear of 22 to 28 μm. On the other hand, the multilayered sintered sliding members of Comparative Examples 1 and 2 were unable to attain 100 hours of the test time under the high load condition, so that the test was discontinued. In addition, in the test on the fatigue durability, the multilayered sintered sliding members of Examples 1 to 5 displayed fatigue durability which was 100 times greater than the multilayered sintered sliding members of Comparative Examples 1 and 2.

As described above, the multilayered sintered sliding members in accordance with Examples possess excellent friction and wear characteristics and fatigue resistance even under a load condition exceeding 49 MPa which is the allowable bearing surface pressure of the conventional multilayered sintered sliding members. Thus, the multilayered sintered sliding members in accordance with Examples enable application to uses where high bearing surface pressure acts, such as toggle bushings of injection molding machines and bearings of joint portions in such construction machines as hydraulic excavators.

Next, a description will be given of Examples in which multilayered sintered sliding members are applied to sliding plates of tabular form.

Examples 6 and 7 and Comparative Example 3 are examples concerning tabular multilayered sintered sliding members.

Examples 6 and 7

Steel plates each formed of a rolled steel for general structural purpose (SS 400) and having dimensions with a width of 170 mm, a length of 600 mm, and a thickness of 5 mm were prepared.

As mixed powders, mixed powders similar to those of Example 1 and Example 4 described above were prepared. With respect to each of the mixed powders, 0.3 wt. % of a 5 wt. % HPC aqueous solution (100 g of HPC, 120 ml of ethyl alcohol, and 1780 ml of water) was added and mixed uniformly in the V type mixer for 5 minutes, and this was used as a raw powder.

The raw powder was passed through the horizontal rolling machine with a twin roll under the conditions of a roll nip of 0.3 mm and a rolling speed of 0.3 m/min to thereby fabricate a rolled sheet (molded green compact) with a density of 6.8 g/cm$^3$ and a thickness of 2 mm This rolled sheet was cut to a size of 170 mm in width and 600 mm in length and was superposed on the steel plate. Subsequently, the superposed assembly was sintered in the sintering furnace adjusted to a cracked ammonia gas atmosphere at a temperature of 960° C. for 85 minutes while applying a pressure of 0.7 kgf/cm$^2$ (0.069 MPa), to effect the diffusion bonding to the steel plate simultaneously with the sintering of the rolled sheet, thereby fabricating a multilayered sliding member in which the sintered alloy layer and the steel plate were diffusion-bonded.

Next, this sintered assembly was subjected to machining, thereby obtaining a multilayered sintered sliding member having sides of 35 mm and a thickness of 6.5 mm. The density of the porous sintered alloy layer of this multilayered sintered sliding member was 6.9 g/cm$^3$. When this multilayered sintered sliding member was subjected to oil impregnation treatment, the oil content of the porous sintered alloy layer was 15 vol. %.

Comparative Example 3

A steel plate similar to those of the above-described Examples 6 and 7, i.e., one formed of a rolled steel for general structural purpose and having dimensions with the width of 170 mm, the length of 600 mm, and the thickness of 5 mm, was prepared.

The following were charged into the V type mixer: 5 wt. % of the atomized Sn powder which passed the 250-mesh sieve; 20 wt. % of the reduced Ni powder which passed the 150-mesh sieve; 7 wt. % of the pulverized P—Cu alloy (P 15%) powder which passed the 120-mesh sieve; 32 wt. % of the reduced Fe powder which passed a 300-mesh sieve; 5 wt. % of the natural graphite powder which passed the 48-mesh sieve but did not pass the 250-mesh sieve; and the balance of the electrolytic Cu powder which passed the 150-mesh sieve. The charged powders were mixed for 30 minutes to thereby obtain a mixed powder (Sn: 5 wt. %, 20 wt. %, P: 1.05 wt. %, Fe: 32 wt. %, natural graphite: 5 wt. %, and Cu: the balance).

With respect to the mixed powder, 0.3 wt. % of the 5 wt. % HPC aqueous solution (similar to those of Examples) was added and mixed uniformly in the V type mixer for 5 minutes, and this was used as a raw powder.

The raw powder was passed through the horizontal rolling machine with a twin roll under the conditions of a roll nip of 0.3 mm and a rolling speed of 0.3 m/min to thereby fabricate a rolled sheet (molded green compact) with a density of 5.90 g/cm$^3$ and a thickness of 2 mm. This rolled sheet was cut to a size of 170 mm in width and 600 mm in length and was superposed on the aforementioned steel plate.

Next, the superposed assembly was sintered in the sintering furnace adjusted to a cracked ammonia gas atmosphere at a temperature of 940° C. for 40 minutes while applying a pressure of 0.7 kgf/cm$^2$ (0.069 MPa), to effect the diffusion bonding to the steel plate simultaneously with the sintering of the rolled sheet, thereby fabricating a multilayered sintered sliding member in which the sintered alloy layer and the steel plate were bonded and integrated.

Next, this sintered assembly was subjected to machining, thereby obtaining a multilayered sintered sliding member having sides of 35 mm and a thickness of 6.5 min, The density of the porous sintered alloy layer of this multilayered sintered sliding member was 6.0 g/cm$^3$. When this multilayered sintered sliding member was subjected to oil impregnation treatment, the oil content of the porous sintered alloy layer was 26 vol. %.

Next, with respect to the multilayered sintered sliding members obtained in Examples 6 and 7 and Comparative Example 3 described above, the friction and wear characteristics were tested under the test conditions shown in Table 5.

TABLE 5

(Friction and Wear Test Conditions)

| | |
|---|---|
| Load bearing surface pressure: | 100 Mpa (1020 kgf/cm$^2$) |
| Sliding speed: | 0.12 m/sec (7 m/min) |
| Stroke: | 80 mm |
| No. of reciprocations: | 100,000 times |
| Mating member: | gray iron (FC 250) plate |
| Lubrication condition: | application of grease before the test start |

Component compositions and test results of the friction and wear characteristics of the multilayered sintered sliding members of Examples 6 and 7 and Comparative Example 3 are shown in Table 6.

TABLE 6

| | Examples | | Comparative Example |
|---|---|---|---|
| | 6 | 7 | 3 |
| Cu | Balance | balance | Balance |
| Sn | 5 | 5 | 5 |
| Ni | 15 | 15 | 20 |
| P | 1.05 | 1.05 | 1.05 |
| Fe | 30 | 40 | 32 |
| High-speed tool steel | 2 | 3 | — |
| Graphite | 2 | 2 | 5 |
| Density of molded green compact (g/cm$^3$) | 6.8 | 6.8 | 5.9 |
| Density of sintered alloy layer (g/cm$^3$) | 6.9 | 6.9 | 6.0 |
| Oil content (vol. %) | 15 | 15 | 26 |
| Coefficient of friction | 0.13-0.15 | 0.11-0.14 | 0.12-0.36 |
| Amount of wear (μm) | 35.0 | 30.0 | 230 |

In Table 6, as for the multilayered sintered sliding member of Comparative Example 3, since the coefficient of friction increased sharply at a point of time when the test time exceeded 30 hours, the test was discontinued at that point of time. As for the amount of wear, the amount of wear after the lapse of 30 hours of the test time is shown.

From the above test results, the multilayered sliding members of Examples 6 and 7 showed stable sliding motion with low coefficients of friction even under a high load condition (100 MPa), and exhibited excellent friction and wear characteristics with small amounts of wear of 35 μm or less, On the other hand, the multilayered sintered sliding member of Comparative Example 3 was unable to attain 100 hours of the test time under the high load condition, so that the test was discontinued.

As described above, in the multilayered sintered sliding member in accordance with the invention, during sintering, the Ni component, which forms the porous sintered alloy layer bonded integrally to the backing plate, is diffused into the surface of the backing plate to thereby alloy its interface, and forms a partial liquid phase with the P component among the components to thereby produce an Ni—P alloy (Ni$_3$P) excelling in affinity with the Cu—Ni—Sn alloy. This Ni$_3$P is interposed at the interface between the backing plate and the porous sintered alloy layer, and firmly bonds and integrates the porous sintered alloy layer to the backing plate, coupled with the alloying due to the diffusion of the Ni component at the interface. In addition, Ni$_3$P, which is a hard intermetallic compound produced during sintering, is interposed at grain boundaries of the Cu—Ni—Sn alloy phase. Furthermore, the hard high-speed tool steel component which in itself is composed of fine intermetallic compounds, principally carbides, is dispersedly contained at the grain boundaries between the Cu—Ni—Sn alloy phase and the αFe phase. Therefore, the fatigue durability, load carrying capacity, and friction and wear characteristics of the porous sintered alloy layer are substantially improved, enabling application to uses where high bearing surface pressure acts.

The invention claimed is:

1. A multilayered sintered sliding member characterized in that a porous sintered alloy layer comprising 3 to 10% by weight of a tin component, 10 to 30% by weight of a nickel component, 0.5 to 4% by weight of a phosphorus component, 30 to 50% by weight of an iron component, 2 to 3% by weight of a high-speed tool steel component, 1 to 5% by weight of a graphite component, and 20 to 55% by weight of a copper component is integrally bonded to a backing plate.

2. The multilayered sintered sliding member according to claim 1, wherein lubricating oil is contained in said porous sintered alloy layer at a rate of 5 to 20% by volume.

3. The multilayered sintered sliding member according to claim 1, wherein said high-speed tool steel component is selected from either one of a molybdenum-based high-speed tool steel and a tungsten-based high-speed tool steel.

4. The multilayered sintered sliding member according to claim 1, wherein said backing plate is formed of a steel pipe, and said porous sintered alloy layer is integrally bonded to an inner surface of said steel pipe.

5. The multilayered sintered sliding member according to claim 1, wherein said backing plate is formed of a steel plate, and said porous sintered alloy layer is integrally bonded to an obverse surface of said steel plate.

* * * * *